United States Patent [19]

Harley et al.

[11] Patent Number: 4,710,227

[45] Date of Patent: Dec. 1, 1987

[54] DISPERSION PROCESS FOR CERAMIC GREEN BODY

[75] Inventors: A. Dale Harley, Midland, Mich.; Lawrence G. Duquette, Maynard, Mass.; Issam A. Khoury, Southboro, Mass.; Iwao Kohatsu, Lexington, Mass.

[73] Assignee: The Dow Chemical Company, Midland, Mich.

[21] Appl. No.: 856,879

[22] Filed: Apr. 28, 1986

[51] Int. Cl.$^4$ .......................... C08L 1/08; C03C 3/00; C04B 35/46

[52] U.S. Cl. .................................. 106/193 R; 501/12; 501/94; 501/104; 501/105; 501/108; 501/112; 501/123; 501/137; 264/63

[58] Field of Search ............................ 106/287.16, 193; 501/12, 104, 105, 94, 137, 108, 112, 123; 264/63

[56] References Cited

U.S. PATENT DOCUMENTS

| | | | |
|---|---|---|---|
| 2,948,648 | 8/1960 | Wainer | 106/39 |
| 3,292,994 | 12/1966 | Kiss et al. | 23/51 |
| 3,330,697 | 7/1967 | Pechini | 117/215 |
| 3,413,083 | 11/1968 | Daenoliker . | |
| 3,458,552 | 7/1969 | Hauck | 260/448 |
| 3,637,531 | 1/1972 | Faxon | 252/520 |
| 3,647,364 | 3/1972 | Mazdiyaeni | 23/51 R |
| 4,049,789 | 9/1977 | Manabe | 423/593 |
| 4,293,514 | 10/1981 | Wada | 264/61 |
| 4,414,337 | 11/1983 | Ichikawa | 501/104 |
| 4,447,853 | 5/1984 | Tomuro et al. | 361/321 |
| 4,510,175 | 4/1985 | Burn | 427/79 |

OTHER PUBLICATIONS

Chem. Abst. 98:77085, Suwa, 1983.
Chem. Abst. 95:231028t, Yamaguchi, 1981.
Chem. Abst. 97:77322, Yamawe, 1982.
Chem. Abst. 90:96712r, Suwa, 1979.
Chem. Abst. 100:113455d, Mitsubishi Mining, 1984.
Chem. Abst. 100:78476n, Kureha Chem., 1984.
Chem. Abst. 100:78479r, Mitsubishi Mining, 1982.
Chem. Abst. 100:149609, 1984.
Chem. Abst. 91:177420, Sakka, 1979.
Chem. Abst. 97:173351, Ozaki, Y., 1982.
Chem. Abst. 94:88931, Kamiya, 1981.

*Primary Examiner*—Theodore Morris
*Attorney, Agent, or Firm*—Barbara J. Sutherland

[57] ABSTRACT

Preparation of a ceramic green body by hydrolyzing two groups of alkoxides to form a dispersion of their reaction product, concentrating the dispersion to a sediment without drying it, and admixing a binder solution, plasticizer and release agent with the sediment to make a ceramic slip formulation. The slip formulation is then cast as a ceramic green body. The proportions of alkoxides can be adjusted to produce a ceramic green body which is dielectric and useful for microcapacitors.

63 Claims, No Drawings

DISPERSION PROCESS FOR CERAMIC GREEN BODY

BACKGROUND OF THE INVENTION

The present invention relates to a process for making a ceramic green body of a type which may be fired into a thin ceramic sheet or tape for use in a multilayer capacitor.

A multilayer capacitor is a stack of a number of ceramic capacitor sheets connected in parallel to produce a capacitor of high total capacitance. These capacitors may be very small, and typically comprise between 40 and 50 ceramic sheets, each about 20 $\mu$m thick. The entire capacitor may be only about 1 mm thick. These devices find many uses in microcircuitry.

However, there is a need for even thinner ceramic bodies, within the range of about 3 to about 10 $\mu$m in thickness. This is due to the fact that equivalent capacitance could be achieved using only half as many of these thinner sheets, since capacitance is inversely proportional to the thickness of the ceramic sheet. The reduction in the number of sheets would then result in a savings in material costs, because the electrode layers interspersed between the ceramic layers are made of expensive noble metals, and with fewer, thinner sheets, fewer electrode layers would be required. In the past it has been very difficult to make sheets of this reduced thickness because current commercial methods of producing the green (unfired) tapes involve processing of solids, including ceramic powders.

These ceramic powders, which are dielectric, are dispersed into an organic solvent such as a methyl ethyl ketone/ethanol mixture. The powders are often barium titanate admixed with other compounds such as strontium titanate, lead titanate, calcium zirconate, lead oxide, borates and silicates. Ball-milling is generally necessary to maximize dispersion in the solvent, and often requires several hours at a minimum. The dispersed powders are then mixed with polymeric organic binders, plasticizers and surfactants to form a slip, which is tape-cast onto a nonporous substrate and dried in an oven to form a flexible "green tape."

To produce a capacitor, this green tape or green body is screen-printed with a noble metal electrode ink. Forty or fifty layers, typically, of the printed tape are then laminated and, after dicing into chips or sheets, fired to burn off the organic binder. The inorganic chips are sintered at high temperatures, typically between about 1000° C. and about 1400° C., to densify the sheets and improve their strength and conductivity. The result is a mechanically and electrically acceptable device.

A problem very commonly faced in this process, however, that tends to militate against reducing the thickness of the sheets or tapes beyond thicknesses currently being produced, is the fact that ceramic powders are usually agglomerated when received and remain so to some extent even after lengthy ball-milling prior to and after dispersion in a solvent. This agglomeration makes it difficult to produce sheets of only about 3 $\mu$m to about 10 $\mu$m in thickness that are of uniform quality, since the size and shape of the initial ceramic particles is a critical factor in producing a good quality final product. It also tends to produce sheets that exhibit less than optimum loading levels, and the reduced density increases the degree of shrinkage of the tape during firing. Ideally, the particles should be uniformly sized and equiaxially shaped, and should also demonstrate high purity.

Therefore, because of the problems associated with the ceramic powders and their general unsuitability to producing the thinner ceramic sheets now sought, it would be desirable to have a ceramic green body prepared from a slip formulation which does not generally require ball-milling or other milling steps at any point and for which powder agglomeration does not present a significant problem, which exhibits good ceramic loading levels, and which therefore does not generally require processing of dry ceramic powders, with the accompanying quality problems and thickness limitations that such processing entails. The present disclosure describes such an invention and involves an in situ finely dispersed slurry that may be used to produce a ceramic green body.

SUMMARY OF THE INVENTION

Accordingly, there is provided a process comprising (a) forming a hydrolyzable solution of a first group of alkoxides comprising at least one compound characterized as $A(OR)_x$, wherein A is at least one metal selected from the group consisting of Be, Mg, Ca, Sr, Ba, Ge, Pb, Sb and Bi, a second group of alkoxides comprising at least one compound characterized as $B(OR)_x$ wherein B is at least one metal selected from the group consisting of Ti, Zr, Sc, Y, La, Nb, Fe, Ta, W, Mn, Sn, Mg, and Zn, and wherein R is a compound characterized as $C_yH_z$ wherein y is an integer from 1 to 10, z is an integer selected from the group consisting of 2y, 2y+1 and 2y−1, and x is an integer from 1 to 7, such that these first and second groups of alkoxides are suitable to be hydrolyzed to form a compound characterized as $ABO_3$, and an alcohol suitable to dissolve said first and second groups of alkoxides; (b) hydrolyzing said hydrolyzable solution to form a hydrolyzed dispersion of this compound characterized as $ABO_3$ in the alcohol; (c) concentrating at least a portion of the dispersion to a sediment; (d) admixing a binder solution, a plasticizer and a release agent with the sediment to make a ceramic slip formulation; and (e) preparing a ceramic green body from this slip formulation.

DESCRIPTION OF THE PREFERRED EMBODIMENTS

The process of the present invention can be advantageously used to prepare a ceramic green body from a solution without the need to use ceramic powders. The term "ceramic green body" refers to a body, often a tape or sheet, of a material that can be converted into a ceramic upon firing.

The starting components to be utilized here typically comprise a first group of alkoxides and a second group of alkoxides which are hydrolyzed together and used in forming a hydrolyzed dispersion in alcohol, with which is then admixed at varying points a binder solution, a plasticizer and a release agent. The alcohol and two groups of alkoxides form what is referred to as the "hydrolyzable solution," before hydrolysis, and afterward is referred to as the "hydrolyzed dispersion." The amounts for each of the components of the present invention have been calculated based on either the hydrolyzable solution or the hydrolyzed dispersion. The alcohol generally comprises from about 80 percent by weight to about 99 percent by weight of the hydrolyzable solution, and preferably from about 90 percent by weight to about 98 percent by weight. The alcohol is preferably selected to minimize, and more preferably avoid, the formation of insoluble alkoxide components through metathetical reactions during the herein disclosed process. Among the preferred alcohols are isopropanol, butanol, sec-butanol, pentanol and isoamyl alcohol. Isopropanol is generally more preferred here.

For the purposes of this invention, the first group of alkoxides desirably comprises at least one metal selected from the group consisting of Be, Mg, Ca, Sr, Ba, Ge, Pb, Sb and Bi, and preferably from the group consisting of Pb, Ca, Ba, Mg and Sr. One or more selections from this group of elements is incorporated as A in the alkoxide formula $A(OR)_x$.

The second group of alkoxides comprises at least one compound characterized as $B(OR)_x$, in which B is a metal chosen from the group consisting of Ti, Zr, Sc, Y, La, Nb, Fe, Ta, W, Mn, Mg, Zn and Sn, preferably from the group consisting of Ti, Zr, Sc, Y, La, Nb, W, Sn, Mg, Ta and Zn. The first and second groups of alkoxides together represent from about 1 percent by weight to about 20 percent by weight of the hydrolyzable solution, and preferably from about 2 percent to about 10 percent by weight.

The R in both of the alkoxide formulas [$A(OR)_x$ and $B(OR)_x$] represents a compound of the general formula $C_yH_z$, wherein y is an integer from 1 to 10 and z is an integer selected from the group consisting of 2y, 2y+1 and 2y−1. The x is an integer from 1 to 7. The two groups of alkoxides are dissolved in the alcohol, and are such that they are suitable to be hydrolyzed to form a compound characterized as $ABO_3$. It is important to note that one or both of these two groups of alkoxides may comprise mixtures of compounds employing the designated elements.

The hydrolysis of the two groups of alkoxides together is necessary and is accomplished by the addition of a greater than stoichiometric amount of water while heating at reflux temperature. This means that the amount of water to be added is preferably from about 0.5 percent to about 10 percent by weight of the hydrolyzable solution, and more preferably from about 0.5 percent to about 3.5 percent. In general, this heating should be of sufficient time and temperature to substantially hydrolyze the solution, and is preferably done for at least 1 hour with continued stirring. Alkoxide solutions refluxing within the range of about 70° C. and about 110° C. are preferred when the alkoxides chosen include barium and titanium because hydrolysis within this temperature range results in the formation of crystallites of $BaTiO_3$ having small, substantially uniform particle size in about the 100Å to about 2000Å range. Even more preferred here are solutions refluxing within the range of about 80° C. and about 90° C. Refluxing may be continued as long as desired, but a time within the range of about ½ hour to about 5 hours is preferred, and about ½ hour to about 1½ hours is more preferred, from a standpoint of yield as well as convenience and commercial practicability.

The water is added in an alcohol solution, preferably within the range of about 10 percent to about 50 percent water. The water and alcohol should be miscible at whatever percent mixed, and again the alcohol for this hydrolysis is preferably selected to minimize, and more preferably to avoid, the formation of insoluble alkoxide components through metathetical reactions. The rate of addition is significant in determining the desired small particle size and reducing the possibility of undesirable agglomeration. It is preferable to use a rate within the range of about 0.2 cubic centimeter per minute (cc/min) and about 0.4 cc/min, more preferably about 0.3 cc/min to about 0.35 cc/min. This latter rate helps produce particles in the 100Å to 300Å range. It is possible to increase the addition rate once an approximately stoichiometric amount of water has been added. If the water is added too rapidly at the start, however, agglomerates may form.

The hydrolysis step results in the conversion of the coordination compound formed by the first and second groups of alkoxides in the alcohol to a dispersion of the compound characterized as $ABO_3$. $BO_3$ preferably comprises combinations of $BaTiO_3$ and from about 2 to about 20 mol percent of such others of the same characterization as $CaZrO_3$, $BaZrO_3$, $PbTiO_3$ and $SrTiO_3$. Other possibilities here include, for example, $CaTiO_3$, $MgTiO_3$, $SrZrO_3$, and related compounds in which any of the designated alkoxide elements is present.

It should be noted that the $ABO_3$ system, which is the hydrolyzed dispersion, ideally displays a small particle size along with a narrow size distribution and substantial uniformity of stoichiometry between the first and second groups of alkoxides. It is preferable to use substantially stoichiometric proportions of these two groups of alkoxides to produce a body exhibiting significant dielectric characteristics. A preferred range is a ratio between the two groups of alkoxides of about 1.1 to about 1, more preferably about 1.05 to about 1, and most preferably about 1.01 to about 1. If dielectric properties are not of importance to a desired application, the proportionality is correspondingly less important. The small and uniform particle size helps to ensure uniform sintering and reduces the likelihood of flaws in the final ceramic green body.

Following the hydrolysis, it is optional to remove the water remaining in a separate step. For this, an azeotropic distillation, for example, may be done so that a substantially dry alcoholic slurry results. Residual water may still be left and will not affect the final outcome as long as the water content is sufficiently low so as not to create binder solubility problems. Other drying methods including, for example, the use of agents such as 1,2-dimethoxypropane, may alternatively be employed. This step is not per se necessary, however, since the subsequent concentration step, described below, serves to minimize the amount of water remaining in the final slip formulation.

A dispersant may be added at this point, in the amount of preferably from about 0.002 percent to about 0.5 percent by weight of the hydrolyzed dispersion, and more preferably about 0.008 to about 0.05 percent. It is alternatively possible to add it to the original alkoxide solution prior to hydrolysis, or to the hydrolyzed dispersion prior to the drying step; however, if drying is done by distillation, a substantial loss of the dispersant may result, which may in turn allow greater agglomeration afterward. Among possible dispersants are, for example, anionic dispersants such as amine salts of alkylaryl sulfonate, ethanol, polyacrylate, methacrylate or menhaden fish oil. Ethanol and amine salts of alkylaryl sulfonate are preferred here, and since ethanol may also be chosen as the alcohol for the original dispersion's formation, a separate dispersant addition may be thereby obviated. The dispersant serves to increase the uniformity and reduce the agglomeration of the $ABO_3$ dispersion.

While the present invention is not limited to a strict order of steps in all respects, obvious limitations will apply in order to produce a mechanically and electrically acceptable device. One step generally occurring after the hydrolysis is the concentration of the disperse, or internal, phase to a nonisolated sediment in a greatly reduced volume of the continuous, or external, phase. The remaining volume of the continuous phase, which is primarily alcohol, is ideally just sufficient to maintain the $ABO_3$ in a nonagglomerated state. Experimentally, this was determined essentially visually. The amount of continuous phase remaining may be determined, for example, by measuring the volume of distillate collected during the drying/concentration step or by the liquid content of the sedimentation volume following gravimetric settling or centrifugation.

Centrifugation provides one effective means of concentration without complete isolation from the continuous phase and is the preferred method. Other means may include distillation, decantation (gravitational sedimentation), or combinations of these procedures. Complete isolation, i.e., drying of the sediment, at any point should be avoided both because of the undesirable agglomeration that will result and because of the difficulty of redispersing the formulation if it has dried. An important point of this invention, as already noted, is that the formulation remains a slurry throughout the processing.

Another important point to the present invention is that it employs a binder solution. The binder serves to help disperse the solids and to stabilize the suspension, and also provides integrity and strength to the final product. If concentration is by distillation, the binder solution may be added prior to concentration, provided that the dispersion, or suspension, is sufficiently water-free. However, in all cases, and especially in the cases of concentration by centrifugation and by gravitational settling, addition of the binder solution after concentration minimizes the loss of binder in the discarded external phase.

The solvent employed for the binder can be aqueous or nonaqueous, with the solvent choice obviously depending on the binder choice. Examples of possible solvents include toluene, methyl ethyl ketone, methanol or a methanol/water mixture, with toluene being preferred. If an organic-based system is chosen, ethylcellulose makes an excellent binder. Other organic binder systems are those using ethyl hydroxyethyl cellulose and polyacrylic acid esters. For a water-based system, polymers such as methylcellulose, hydroxypropyl ethylcellulose, hydroxybutyl methylcellulose, carboxymethylcellulose, hydroxyethylcellulose, polyvinylalcohols, polyvinylpyrrolidones, poly(acrylic acid), polyacrylamide, polyethylene oxides and mixtures of these polymers can be employed as binders in formulating the slip. The cellulose ethers are preferred binders, and more preferred here is water-soluble methylcellulose. Obviously, an aqueous binder system obviates the need to substantially remove water from the hydrolyzed dispersion.

The use of these and related binders will help to form a very uniform slip that upon casting forms a thin transparent film, indicating good uniformity of metal oxide particulates and binder particulates. The particulates range from about 100Å to about 2000Å in size. The binder solvent represents preferably from about 1 percent to about 6 percent by weight of the hydrolyzed dispersion, and more preferably from about 2 percent to about 4 percent. The binder itself is preferably from about 0.1 percent by weight to about 5 percent by weight, and more preferably from about 0.1 percent to about 1 percent.

A release agent, such as a polyol or mineral oil, may also be added to the binder solution prior to adding the solution to the dispersion. This serves to facilitate easy stripping of the green tape from the casting substrate. When using a glass substrate, 1,2,4-butanetriol makes an excellent release agent. Nonglass substrates, such as polypropylene, may also be used while employing other release agents. The release agent preferably amounts from about 0.01 percent to about 5 percent by weight of the hydrolyzed dispersion, and more preferably from about 0.05 percent to about 3 percent.

In the present invention, a plasticizer is also employed and serves to lower the glass transition point of the binder to ambient or room temperature to increase the flexibility of the film, thereby making the green body or tape more easily removed from the substrate and more suitable for lamination. Examples of typical plasticizers include dimethyl formamide and propylene glycol, both of which are particularly effective in a methylcellulose aqueous solution, and dioctyl phthalate and benzyl butyl phthalate, both of which work well in an ethylcellulose organic-based system. For an ethylcellulose binder solution, dioctyl phthalate and benzyl butyl phthalate are preferred plasticizers. The plasticizer is added preferably in an amount of from about 0.01 percent to about 5 percent by weight of the hydrolyzed dispersion, and more preferably from about 0.05 percent to about 3 percent.

It is important when adding the binder solution containing the plasticizer and release agent to the $ABO_3$ dispersion to use some means to keep the viscosity of the dispersion as low as possible. This should be done both during and after the addition of the binder. Means such as the use of appropriate commercially available surfactants may be employed when necessary to avoid agglomeration.

The final component of the slip formulation is optionally one or more sintering aids. For these, low-melting eutectic oxide mixtures may be employed, including compounds such as $GeO_2$, $B_2O_3$, $PbO$, $Bi_2O_3$, $TiO_2$, $Sb_2O_3$, $SnO$, and $SiO_2$, preferably $GeO_2$, $B_2O_3$, $PbO$, $Bi_2O_3$, $Sb_2O_3$, and $SnO$. There are various ways in which one or more of these can be added so that they can perform their function of densifying the ceramic film and thereby increasing its strength and dielectric properties. In one preferred embodiment a third group of alkoxides of a type that will form sintering aids, such as glass frits, upon hydrolysis is selected. This group is then hydrolyzed in alcohol either concurrently with the first and second groups of alkoxides, in a stepwise fashion before or after the hydrolysis of the first and second groups, or entirely separately from the first and second groups. In the latter case the eutectic oxide mixture may be added at any subsequent point in the process of the present invention, such as prior to or after concentration or along with the addition of binder solution, plasticizer, release agent and so forth. Alternatively, the sintering aid to be employed may be purchased commercially, obviating the need for hydrolyzing a third group of alkoxides. The amount used represents from about 0.01 percent to about 2 percent by weight of the hydrolyzed dispersion, and preferably from about 0.03 percent to about 0.2 percent by weight. To further augment the dielectric properties of the final film, dopants that will form $MnO$, $Mn_2O_3$, $CoO$, or $Co_2O_3$ may also be added but are not necessary to the present invention.

The last step of this process involves the conversion of the uniform concentrated dispersion into a ceramic green body using known methods, such as curtain-coating, tape-casting or doctor-blading. It is preferred to tape-cast a single layer of the nonisolated dispersion sediment onto a nonporous substrate. The techniques for converting slip formulations into flexible green tapes are well known. For example, see the chapter "Tape-Casting of Ceramics" in *Ceramic Processing Before Firing*, edited by G. Y. Onada, Jr. and L. L. Hench, John Wiley and Sons, Inc., N.Y. (1978), pp. 411-447.

The green body prepared according to the process of the present invention can then be converted using known methods into a thin ceramic sheet or tape. Typically, the green body is calcined to burn off the polymer and to convert the tape or sheet to a ceramic material. This is then sintered, or fired, at a temperature of from about 1000° C. to about 1400° C. Advantageously, the green body of the present invention exhibits a good loading level which tends to reduce shrinkage upon firing. Preferably, the fired ceramic sheets, which may also be called films, of the present invention range from about 1 $\mu$m to about 50 $\mu$m in thickness, more preferably from about 3 $\mu$m to about 10 $\mu$m. They can be employed in the preparation of capacitors which have a reduced volume compared to many known capacitors due to the increased capacitance of the thinner sheets. Thus, these capacitors may be less expensive to produce than many known capacitors because they require fewer noble metal electrode layers.

It should be noted that steps necessary to the present invention, regardless of order taken, include the preparation of a hydrolyzed dispersion of the first and second groups of alkoxides, provided hydrolysis of these two groups occurs together, the concentration of the dispersion, and the addition of binder solution, plasticizer and release agent to make a slip formulation to be used in preparing a ceramic green body. The order of addition of the binder solution, plasticizer and release agent may be varied. As noted, for example, the binder solution, plasticizer and release agent, or any combination thereof, may be added prior to the concentration, although it is preferable to add these after the concentration to minimize their loss in any discarded external phase. The optional dispersant cannot be added before the hydrolysis, but may be added either before or after an optional drying step. Hydrolysis itself may be done in more than one step, with a third group of alkoxides hydrolyzed in order to supply the optional sintering aids, and then the first and second groups of alkoxides added for a second hydrolysis, for example, or in reverse order. Other variations in order are also possible, including having more than one addition step for a given component, as long as the weight percent ranges are satisfied. As noted, commercial sintering aids may alternatively be used and dispersed at various points in the process.

The following examples are given to illustrate the present invention and are not intended to be, nor should they be construed as being, limitative in any way of the scope of the invention. All parts and percentages are by weight unless otherwise indicated.

EXAMPLE 1

About 6.2 g (0.0218 mole) of titanium isopropoxide [Ti(i-$C_3H_7O$)$_4$], 6.8 g (0.0215 mole) of barium isopropoxide isopropylate [Ba(i-$C_3H_7O$)$_2$.$C_3H_7OH$], and 150 ml of isopropanol were added to a 500 ml Schlenk flask in a dry box. The admixture was refluxed over argon for 30 minutes to produce a colorless solution.

A solution of 5 ml water and 5 ml isopropanol was then added to the refluxing solution at the rate of about 0.2 ml/min. The water/isopropanol solution had been degassed previously. The addition was made via a 1/16" cannular tube and the solution was continually stirred during the addition. At this point the reaction mix showed a dispersion of finely divided white particles. Refluxing was continued for about 2 hours, and the solution allowed to cool naturally.

The final product, a milky dispersion, was then allowed to sit in a graduated cylinder at room temperature. There was produced a gravitational sediment volume of 25 ml in which was estimated to be about 3.2 g of $BaTiO_3$.

The XRD pattern of the settled $BaTiO_3$ showed an average crystallite diameter of 110Å which would correspond to a surface area of 91 $m^2$/g. TEM showed primary particles (spheres) measuring about 185Å in diameter.

To a mechanically stirred gravitational sediment volume of this $BaTiO_3$ (3.2 g/25 cc) prepared in the above manner was added dioctyl phthalate, 0.3 g, as a plasticizer, and 1,2,4-butanetriol, 0.3 g, as a release agent. This dispersion was stirred at 300 rpm for 10 minutes and 0.8 g of ETHOCEL* 45 brand ethylcellulose was added over a 30 minute period, as a binder. (*ETHOCEL is a trademark of The Dow Chemical Company.) Stirring was then continued an additional 1.5 hours. One ml of a 0.6 percent by weight solution of an amine salt of alkylaryl sulfonate in isopropanol was then added as a dispersant.

An 8.0 mil thick film was cast on glass using a doctor-blade. The film was dried at room temperature in air to produce a translucent 0.7 mil film that was easily stripped from the glass surface. X-ray powder diffraction line broadening measurements of this film showed an average crystallite size of 133Å. STEM (Scanning Transmission Electron Microscopy) photos showed slightly agglomerated particles with an average primary particle diameter of 200Å. Thermogravimetric analysis of the film gave a ceramic content of the film of about 67 percent by weight.

EXAMPLE 2

Ba(i-$C_3H_7O$)$_2$ (4.63 g, 0.0182 mole), Sr(i-$C_3H_7O$)$_2$ (0.71 g, 0.0034 mole), Ti(i-$C_3H_7O$)$_4$ (5.92 g, 95 percent in isopropanol, 0.0197 mole), Zr(n-$C_3H_7O$)$_4$ (0.75 g, 95 percent in isopropanol, 0.0022 mole) and Pb(i-$C_3H_7O$)$_2$ (0.14 g, 4.3 $\times 10^{-3}$ mole) were dissolved in 250 ml of dried and deoxygenated isopropanol. The solution was added to a stirred reaction vessel under an inert atmosphere and refluxed for about 45 minutes. A 10 percent by volume solution of distilled water in isopropanol, as a solvent, was added at a rate of about 0.3 ml/min, until a volume of 35 ml was added. The addition rate was then increased to 3 ml/min until a total volume of 100 ml had been delivered. Reflux was continued an additional 1.5 hours during which hydrolysis was substantially completed.

The water was removed by azeotropic distillation and the suspension was then concentrated by centrifuging at 40 G until a bed volume of 25 ml was obtained. The nonisolated product was estimated to weigh about 5 g and analysis showed it to have the nominal composition: BaTiO$_3$, 71.77 percent; SrTiO$_3$, 12.23 percent; BaZrO$_3$, 11.56 percent; TiO$_2$, 0.58 percent; and PbO, 3.85 percent.

ETHOCEL 45 ethylcellulose, 1 g, was dissolved in 10 ml of toluene and 1 ml of ethanol, and 0.3 g of dioctyl phthalate and 0.7 g of propylene glycol were added. The solution was then added to the centrifugate and the mixture stirred for about 2 hours. The resultant slip had a viscosity of about 400 centipoise. The slip was then cast by doctor-blade at 5 and 10 mil thicknesses, resulting in transparent dried films of 0.7 and 1.5 mil thicknesses, respectively. Laminates of 10 layers of the films pressed at 250° C. and 1500 psi were translucent and had a ceramic content of about 71.5 weight percent.

What is claimed is:

1. A process comprising:
   (a) forming a hydrolyzable solution of a first group of alkoxides comprising at least one compound characterized as A(OR)$_x$,
      wherein A is at least one metal selected from the group consisting of Be, Mg, Ca, Sr, Ba, Ge, Pb, Sb and Bi,
      a second group of alkoxides comprising at least one compound characterized as B(OR)$_x$,
      wherein B is at least one metal selected from the group consisting of Ti, Zr, Sc, Y, La, Nb, Fe, Ta, W, Mn, Sn, Mg, and Zn, and
      wherein R is a compound characterized as C$_y$H$_z$
      wherein y is an integer from 1 to 10,
      z is an integer selected from the group consisting of 2y, 2y+1 and 2y−1, and
      x is an integer from 1 to 7,
      such that said first and second groups of alkoxides are suitable to be hydrolyzed to form a compound characterized as ABO$_3$,
      and an alcohol suitable to dissolve said first and second groups of alkoxides;
   (b) hydrolyzing said hydrolyzable solution to form a hydrolyzed dispersion of said compound characterized as ABO$_3$ in said alcohol;
   (c) concentrating at least a portion of said dispersion to a sediment;
   (d) admixing a binder solution, a plasticizer, and a release agent with said sediment to make a ceramic slip formulation; and
   (e) preparing a ceramic green body from said slip formulation.

2. The process of claim 1 wherein said hydrolyzable solution is hydrolyzed by adding water in an amount from about 0.5 percent to about 10 percent by weight of said hydrolyzable solution.

3. The process of claim 1 wherein said first and second groups of alkoxides are hydrolyzed together.

4. The process of claim 1 wherein A is a member of the group consisting of Mg, Ca, Sr, Ba and Pb.

5. The process of claim 1 wherein B is a member of the group consisting of Ti, Zr, Sc, Y, La, Nb, Ta, W, Sn, Mg and Zn.

6. The process of claim 1 wherein said alcohol comprises from about 80 percent to about 99 percent by weight of said hydrolyzable solution.

7. The process of claim 1 wherein said first and second group of alkoxides, combined, comprise from about 1 percent to about 20 percent by weight of said hydrolyzable solution.

8. The process of claim 1 wherein a dispersant is admixed with said hydrolyzed dispersion or said sediment.

9. The process of claim 8 wherein said dispersant comprises from about 0.002 percent to about 0.5 percent by weight of said hydrolyzed dispersion.

10. The process of claim 8 wherein said dispersant is selected from the group consisting of ethyl alcohol, amine salts of alkylaryl sulfonate, polyacrylate, methacrylate, menhaden fish oil, and mixtures thereof.

11. The process of claim 1 wherein said binder solvent comprises from about 1 percent to about 6 percent by weight of said hydrolyzed dispersion.

12. The process of claim 1 wherein said binder comprises from about 0.1 percent to about 5 percent by weight of said hydrolyzed dispersion.

13. The process of claim 1 wherein said binder is selected from the group consisting of ethylcellulose, methylcellulose, ethyl hydroxyethyl cellulose, and mixtures thereof.

14. The process of claim 1 wherein said plasticizer comprises from about 0.01 percent to about 5 percent by weight of said hydrolyzed dispersion.

15. The process of claim 1 wherein said plasticizer is selected from the group consisting of dioctyl phthalate, dimethyl formamide, benzyl butyl phthalate, propylene glycol, and mixtures thereof.

16. The process of claim 1 wherein said release agent comprises from about 0.01 percent to about 5 percent by weight of said hydrolyzed dispersion.

17. The process of claim 1 wherein said release agent is selected from the group consisting of a polyol, mineral oil, or mixtures thereof.

18. The process of claim 17 wherein said polyol is 1,2,4-butanetriol.

19. The process of claim 1 wherein said hydrolyzed dispersion comprises excess water.

20. The process of claim 19 wherein said excess water is substantially removed prior to admixing said binder solution.

21. The process of claim 20 wherein said excess water is substantially removed by means of said concentration.

22. The process of claim 20 wherein said excess water is substantially removed by means of azeotropic distillation.

23. The process of claim 20 wherein said excess water is substantially removed by means of a drying agent.

24. The process of claim 1 wherein said slip formulation comprises a sintering aid.

25. The process of claim 24 wherein said sintering aid is prepared by hydrolysis of a suitable third group of alkoxides.

26. The process of claim 24 wherein said sintering aid comprises a low-melting eutectic oxide mixture.

27. The process of claim 25 wherein said third group of alkoxides comprises from about 0.01 percent to about 2 percent by weight of said hydrolyzed dispersion.

28. The process of claim 25 wherein said third group of alkoxides is hydrolyzed separately from said first and second groups of alkoxides.

29. The process of claim 25 wherein said third group of alkoxides is hydrolyzed together with said first and second groups of alkoxides.

30. The process of claim 1 wherein said ceramic green body is a sheet within the range of about 1 μm to about 50 μm in thickness.

31. The process of claim 1 wherein said ceramic green body is a sheet within the range of about 3 μm to about 10 μm.

32. A ceramic green body prepared by a process comprising:

(a) forming a hydrolyzable solution of a first group of alkoxides comprising at least one compound characterized as $A(OR)_x$, wherein A is at least one metal selected from the group consisting of Be, Mg, Ca, Sr, Ba, Ge, Pb, Sb and Bi, and a second group of alkoxides comprising at least one compound characterized as $B(OR)_x$, wherein B is at least one metal selected from the group consisting of Ti, Zr, Sc, Y, La, Nb, Fe, Ta, W, Mn, Sn, Mg, and Zn, and wherein R is a compound characterized as $C_yH_z$ wherein y is an integer from 1 to 10, z is an integer selected from the group consisting of 2y, 2y+1 and 2y−1, and x is an integer from 1 to 7, such that said first and second groups of alkoxides are suitable to be hydrolyzed to form a compound characterized as $ABO_3$, and an alcohol suitable to dissolve said first and second groups of alkoxides;

(b) hydrolyzing said hydrolyzable solution to form a hydrolyzed dispersion of said compound characterized as $ABO_3$ in an alcohol;

(c) concentrating at least a portion of said dispersion to a sediment;

(d) admixing a binder solution, a plasticizer and a release agent with said sediment to make a ceramic slip formulation; and (e) preparing a ceramic green body from said slip formulation.

33. The process of claim 32 wherein said hydrolyzable solution is hydrolyzed by adding water in an amount from about 0.5 percent to about 10 percent by weight of said hydrolyzable solution.

34. The process of claim 32 wherein said first and second groups of alkoxides are hydrolyzed together.

35. The process of claim 32 wherein A is a member of the group consisting of Mg, Ca, Sr, Ba and Pb.

36. The process of claim 32 wherein B is a member of the group consisting of Ti, Zr, Sc, Y, La, Nb, Ta, W, Sn, Mg and Zn.

37. The process of claim 32 wherein said alcohol comprises from about 80 percent to about 99 percent by weight of said hydrolyzable solution.

38. The process of claim 32 wherein said first and second group of alkoxides, combined, comprise from about 1 percent to about 20 percent by weight of said hydrolyzable solution.

39. The process of claim 32 wherein a dispersant is admixed with said hydrolyzed dispersion.

40. The process of claim 39 wherein said dispersant comprises from about 0.002 percent to about 0.5 percent by weight of said hydrolyzed dispersion.

41. The process of claim 39 wherein said dispersant is selected from the group consisting of ethyl alcohol, amine salts of alkylaryl sulfonate, polyacrylate, methacrylate, menhaden fish oil, and mixtures thereof.

42. The process of claim 32 wherein said binder solvent comprises from about 1 percent to about 6 percent by weight of said hydrolyzed dispersion.

43. The process of claim 32 wherein said binder comprises from about 0.1 percent to about 5 percent by weight of said hydrolyzed dispersion.

44. The process of claim 32 wherein said binder is selected from the group consisting of ethylcellulose, methylcellulose, ethyl hydroxyethyl cellulose, and mixtures thereof.

45. The process of claim 32 wherein said plasticizer comprises from about 0.01 percent to about 5 percent by weight of said hydrolyzed dispersion.

46. The process of claim 32 wherein said plasticizer is selected from the group consisting of dioctyl phthalate, dimethyl formamide, benzyl butyl phthalate, propylene glycol, and mixtures thereof.

47. The process of claim 32 wherein said release agent comprises from about 0.01 percent to about 5 percent by weight of said hydrolyzed dispersion.

48. The process of claim 32 wherein said release agent is selected from the group consisting of a polyol, mineral oil, or mixtures thereof.

49. The process of claim 48 wherein said polyol is 1,2,4-butanetriol.

50. The process of claim 32 wherein said hydrolyzed dispersion comprises excess water.

51. The process of claim 50 wherein said excess water is substantially removed prior to admixing said binder solution.

52. The process of claim 51 wherein said excess water is substantially removed by means of said concentration.

53. The process of claim 51 wherein said excess water is substantially removed by means of an azeotropic distillation.

54. The process of claim 51 wherein said excess water is substantially removed by means of a drying agent.

55. The process of claim 32 wherein said slip formulation comprises a sintering aid.

56. The process of claim 55 wherein said sintering aid comprises a low-melting eutectic oxide mixture.

57. The process of claim 55 wherein said sintering aid is formed by hydrolysis of a suitable third group of alkoxides.

58. The process of claim 57 wherein said third group of alkoxides comprises from about 0.01 percent to about 2 percent by weight of said hydrolyzed dispersion.

59. The process of claim 57 wherein said third group of alkoxides is hydrolyzed separately from said first and second groups of alkoxides.

60. The process of claim 57 wherein said third group of alkoxides is hydrolyzed together with said first and second groups of alkoxides.

61. The process of claim 32 wherein said ceramic green body is a sheet within the range of about 1 μm to about 50 μm in thickness.

62. The process of claim 32 wherein said ceramic green body is a sheet within the range of about 3 μm to about 10 μm.

63. A process comprising:

(a) forming a hydrolyzable solution comprising an alcohol from about 80 to about 99 percent by weight of said hydrolyzable solution, a first group of alkoxides and a second group of alkoxides, said groups of alkoxides combined being from about 1 percent to about 20 percent by weight of said hydrolyzable solution with said first group of alkoxides comprising at least one compound characterized as $A(OR)_x$, wherein A is at least one metal selected from the group consisting of Be, Mg, Ca, Sr, Ba, Ge, Pb, Sb and Bi, and said second group of alkoxides comprising at least one compound characterized as $B(OR)_x$, wherein B is at least one metal selected from the group consisting of Ti, Zr, Sc, Y, La, Nb, Fe, Ta, W, Mn, Sn, Mg, and Zn, and wherein R is a compound characterized as $C_yH_z$
wherein y is an integer from 1 to 10,
z is an integer selected from the group consisting of $2y$, $2y+1$ and $2y-1$, and
x is an integer from 1 to 7,
such that said first and second groups of alkoxides suitable to be hydrolyzed to form a compound characterized as $ABO_3$, (b) hydrolyzing said hydrolyzable solution to form a hydrolyzed dispersion of said compound characterized as $ABO_3$ in an alcohol;

(c) substantially concentrating said dispersion to a sediment;

(d) admixing a binder from about 0.1 percent to about 5 percent by weight of said hydrolyzed dispersion dissolved in a binder solvent from about 1 percent to about 6 percent by weight of said hydrolyzed dispersion, a plasticizer from about 0.01 percent to about 5 percent by weight of said hydrolyzed dispersion, and a release agent from about 0.01 percent to about 5 percent by weight of said hydrolyzed dispersion with said sediment to make a ceramic slip formulation; and (e) preparing a ceramic green body from said slip formulation.

* * * * *

UNITED STATES PATENT AND TRADEMARK OFFICE
CERTIFICATE OF CORRECTION

PATENT NO. : 4,710,227

DATED : December 1, 1987

INVENTOR(S) : A. Dale Harley, Lawrence G. Duquette, Issam A. Khoury, and Iwao Kohatsu It is certified that error appears in the above-identified patent and that said Letters Patent is hereby corrected as shown below:

Column 4, line 12 please delete "$BO_3$" and insert at the same location -- $ABO_3$ --.

Signed and Sealed this

First Day of November, 1988

Attest:

DONALD J. QUIGG

*Attesting Officer*  *Commissioner of Patents and Trademarks*